(12) United States Patent
Sugiura et al.

(10) Patent No.: US 8,465,880 B2
(45) Date of Patent: Jun. 18, 2013

(54) FUEL CELL STACK

(75) Inventors: Seiji Sugiura, Utsunomiya (JP);
Masaaki Sakano, Utsunomiya (JP);
Masaru Oda, Utsunomiya (JP);
Yasuhiro Watanabe, Kawaguchi (JP)

(73) Assignee: Honda Motor Co., Ltd., Tokyo (JP)

( * ) Notice: Subject to any disclaimer, the term of this patent is extended or adjusted under 35 U.S.C. 154(b) by 172 days.

(21) Appl. No.: 13/000,963

(22) PCT Filed: Jun. 5, 2009

(86) PCT No.: PCT/JP2009/060336
§ 371 (c)(1),
(2), (4) Date: Mar. 18, 2011

(87) PCT Pub. No.: WO2009/157290
PCT Pub. Date: Dec. 30, 2009

(65) Prior Publication Data
US 2011/0159395 A1   Jun. 30, 2011

(30) Foreign Application Priority Data
Jun. 27, 2008 (JP) .................. 2008-169033

(51) Int. Cl.
*H01M 8/24* (2006.01)
*H01M 2/40* (2006.01)
*H01M 2/38* (2006.01)

(52) U.S. Cl.
USPC .......................................... 429/457; 429/452

(58) Field of Classification Search
USPC ....................................................... 429/457
See application file for complete search history.

(56) References Cited

U.S. PATENT DOCUMENTS

2006/0204807 A1  9/2006 Kosaka et al.
2006/0216572 A1* 9/2006 Yoshida et al. .................. 429/38
2007/0254203 A1* 11/2007 Ishida et al. .................... 429/38

FOREIGN PATENT DOCUMENTS

JP           8-222237           8/1996

OTHER PUBLICATIONS

International Search Report for Application No. PCT/JP2009/060336, dated Sep. 8, 2009.
Supplementary European Search Report for Application No. 09770000.9, dated Oct. 4, 2011.

* cited by examiner

*Primary Examiner* — Ula C Ruddock
*Assistant Examiner* — Jacob Marks
(74) *Attorney, Agent, or Firm* — Nelson Mullins Riley & Scarborough LLP; Anthony A. Laurentano

(57) ABSTRACT

There has been a problem that the cell units cannot bear the load exerted on the units while being stacked since a fuel cell stack including a refrigerant channel formed between cell units each having an even number of electrolyte/electrode structures (MEA) and metal separators which are alternated does not have any structure supporting the separators forming the refrigerant channel in a stacking direction. In order to solve the above problem, in each of a first power generating unit and a second power generating unit, projections formed at the buffer portions of the separators are disposed in the same positions in the stacking direction with the MEA interposed therebetween. Since between the first and second power generating units, the projections of the buffer portions are staggered, the projections of the first and second power generating units are thereby disposed in the same positions in the stacking direction.

2 Claims, 5 Drawing Sheets

FUEL CELL STACK

RELATED APPLICATIONS

This application is a 35 U.S.C. 371 national stage filing of International Application No. PCT/JP2009/060336, filed Jun. 5, 2009, which claims priority to Japanese Patent Application No. 2008-169033 filed on Jun. 27, 2008 in Japan. The contents of the aforementioned applications are hereby incorporated by reference.

TECHNICAL FIELD

The present invention relates to a fuel cell stack including power generation units formed by stacking an even number of electrolyte electrode assemblies and metal separators alternately. Each of the electrolyte electrode assemblies includes an anode, a cathode, and an electrolyte interposed between the anode and the cathode. A fuel gas flow field for supplying a fuel gas to the anode and an oxygen-containing gas flow field for supplying an oxygen-containing gas to the cathode are formed in each of the power generation units. Each of the fuel gas flow field and the oxygen-containing gas flow field has an uneven buffer at least at one of a flow field inlet and a flow field outlet of the fuel gas flow field and the oxygen-containing gas flow field. The power generation units include a first power generation unit and a second power generation unit stacked alternately such that a coolant flow field is formed between the first power generation unit and the second power generation unit.

BACKGROUND ART

For example, a solid polymer electrolyte fuel cell employs an electrolyte membrane. The electrolyte membrane is a polymer ion exchange membrane, and interposed between an anode and a cathode to form a membrane electrode assembly (MEA). The membrane electrode assembly is sandwiched between a pair of separators to form a unit cell. In use, normally, a predetermined number of the unit cells are stacked together to form a fuel cell stack.

In the fuel cell, a fuel gas flow field is formed in a surface of one separator facing the anode for supplying a fuel gas to the anode, and an oxygen-containing gas flow field is formed in a surface of the other separator facing the cathode for supplying an oxygen-containing gas to the cathode. Further, a coolant flow field is formed between the separators for supplying a coolant along surfaces of the separators as necessary.

In the case where metal separators are used as the separators, by providing grooves as the fuel gas flow field on one surface of the metal separator facing the anode, ridges as the back side of the grooves are formed on the other surface of the metal separator. Further, by forming grooves as the oxygen-containing gas flow field on one surface of the metal separator facing the cathode, ridges as the back side of the grooves are formed on the other surface of the metal separator.

For example, a fuel cell separator disclosed in Japanese Laid-Open Patent Publication No. 08-222237 is known. According to the disclosure, in a fuel cell stack formed by stacking a plurality of fuel cells including a solid electrolyte and electrodes on both sides of the solid electrolyte, the fuel cell separator is inserted between the fuel cells. Fuel gas flow grooves for supplying a fuel gas to one of the adjacent fuel cells are formed on one surface of the fuel cell separator, and oxygen-containing gas flow grooves for supplying an oxygen-containing gas to the other of the adjacent fuel cells are formed on the other surface of the fuel cell separator.

This separator is made of metal material having good workability. Material having good electrical conductivity is coated on front and back surfaces of the separator. Further, a large number of projections are provided at suitable intervals on the front and back surfaces of the separator. In the fuel cell stack, the projections contact the cell surfaces of the fuel cells. The fuel gas flow grooves and the oxygen-containing gas flow grooves between the separator and the adjacent fuel cells are formed by spaces between the projections.

SUMMARY OF INVENTION

The fuel cell stack may adopt so called skip cooling structure where the coolant flow field is formed at intervals of a predetermined number of unit cells. FIG. 5 shows a fuel cell where the above conventional technique is adopted in the fuel cell having the skip cooling structure of this type. The fuel cell is formed by stacking a plurality of cell units 3 each including two MEAs 1a, 1b, and three metal separators 2a, 2b, and 2c.

Each of the MEAs 1a, 1b includes an anode 4b, a cathode 4c, and a solid electrolyte membrane 4a interposed between the anode 4b and the cathode 4c. The metal separator 2a has a plurality of projections 5a forming a fuel gas flow field 5 for supplying a fuel gas to the anode 4b of the MEA 1a. The metal separator 2b has a plurality of projections 6a forming an oxygen-containing gas flow field 6 for supplying an oxygen-containing gas to the cathode 4c of the MEA 1a and a plurality of projections 5a forming a fuel gas flow field 5 for supplying a fuel gas to the anode 4b of the MEA 1b alternately.

The metal separator 2c has a plurality of projections 6a forming an oxygen-containing gas flow field 6 for supplying an oxygen-containing gas to the cathode 4c of the MEA 1b. A coolant flow field 7 for supplying a coolant is formed between the adjacent metal separators 2c, 2a.

The projections 5a, 6a of the metal separators 2a, 2b sandwiching the MEA 1a are provided at the same positions in the stacking direction. Further, the projections 5a, 6a of the metal separators 2b, 2c sandwiching the MEA 1b are provided at the same positions in the stacking direction.

However, when the coolant flow field 7 is formed between the cell units 3, in the coolant flow field 7, the metal separators 2c, 2a do not support each other in the stacking direction because the projections and the recess face each other in the stacking direction. In the structure, the fuel cell stack cannot withstand the load between the cell units 3 when the cell units 3 are stacked together. Further, the fuel cell stack cannot withstand the pressure change during power generation.

As a result, the fuel cell stack may be damaged undesirably due to deformation of the MEAs 1a, 1b and the metal separators 2a to 2c. Further, the desired electrical conduction between the cell units 3 cannot be achieved.

The present invention is based on the fuel cell having skip cooling structure of this type, and an object of the present invention is to provide a fuel cell stack having simple and economical structure in which it is possible to reliably retain the structure of components between power generation units forming a coolant flow field, and suitably prevent deformation of electrolyte electrode assemblies and metal separators.

The present invention relates to a fuel cell stack including power generation units formed by stacking an even number of electrolyte electrode assemblies and metal separators alternately. Each of the electrolyte electrode assemblies includes an anode, a cathode, and an electrolyte interposed between the anode and the cathode. A fuel gas flow field for supplying a fuel gas to the anode and an oxygen-containing gas flow field for supplying an oxygen-containing gas to the cathode are formed in each of the power generation units. Each of the fuel gas flow field and the oxygen-containing gas flow field has an uneven buffer at least at one of a flow field inlet and a flow field outlet of the fuel gas flow field and the oxygen-containing gas flow field. The power generation units include a first power generation unit and a second power generation unit stacked alternately such that a coolant flow field is formed between the first power generation unit and the second power generation unit.

In the first power generation unit, bosses in the buffer for the fuel gas flow field and bosses in the buffer for the oxygen-containing gas flow field sandwiching each of the electrolyte electrode assemblies are arranged at the same positions in the stacking direction. In the second power generation unit, bosses in the buffer for the fuel gas flow field and bosses in the buffer for the oxygen-containing gas flow field sandwiching each of the electrolyte electrode assemblies are arranged at the same positions in the stacking direction and are staggered from the bosses in the buffers of the first power generation unit.

Preferably, the first and second power generation units include at least first and second electrolyte electrode assemblies, the first electrolyte electrode assembly is stacked on a first metal separator, a second metal separator is stacked on the first electrolyte electrode assembly, the second electrolyte electrode assembly is stacked on the second metal separator, and a third metal separator is stacked on the second electrolyte electrode assembly.

In the present invention, in each of the first power generation unit and the second power generation unit, the bosses of the buffers contacting each of the electrolyte electrode assemblies are in the same phase with each other. In the structure, no shearing force is applied to the electrolyte electrode assemblies, and damages of the electrolyte electrode assemblies can be prevented advantageously.

Further, in the buffer of the first power generation unit and the buffer of the second power generation unit, bosses facing each other toward the coolant flow field are arranged at the same positions in the stacking direction.

That is, each of the first power generation unit and the second power generation includes an even number of electrolyte electrode assemblies and an odd number of metal separators. In each of the first and the second power generation units, the bosses sandwiching each of electrolyte electrode assemblies arranged at both ends in the stacking direction are staggered from each other in the stacking direction. Thus, in the first power generation unit and the second power generation unit, the bosses toward the coolant flow field of each of the adjacent metal separators are arranged in the same phase.

Therefore, also in the coolant flow field, the bosses face each other in the stacking direction. Thus, it becomes possible to provide structure of withstanding the load in the stacking direction, and withstanding the pressure change during power generation. In the structure, simply by stacking the first power generation unit and the second power generation unit alternately, the fuel cell stack can be produced simply and economically.

DESCRIPTION OF EMBODIMENTS

Figure 1:
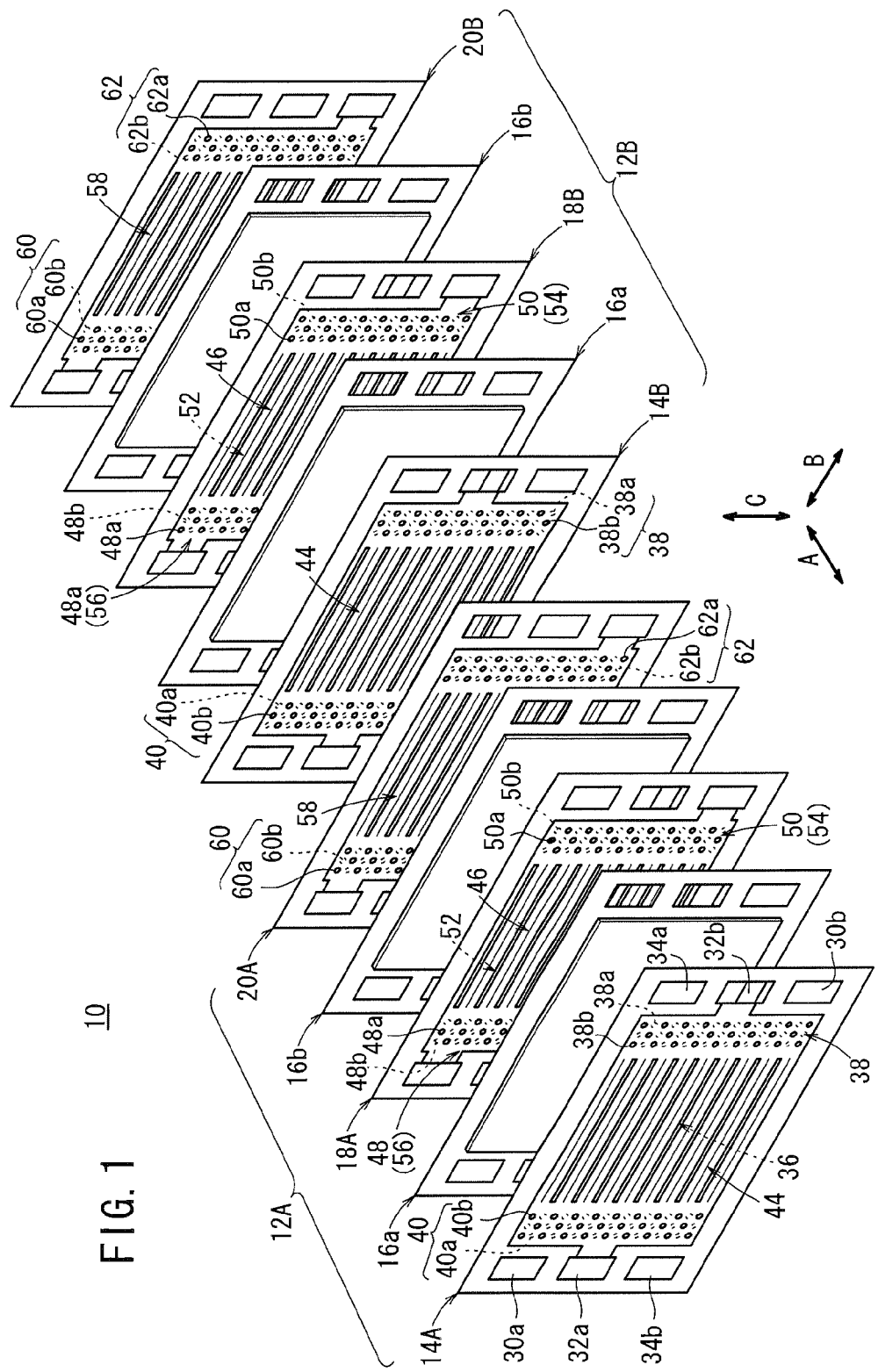
FIG. 1 is an exploded perspective view showing main components of a fuel cell stack according to an embodiment of the present invention.

FIG. 1 is an exploded perspective showing main components of a fuel cell stack 10 according to an embodiment of the present invention.

Figure 2:
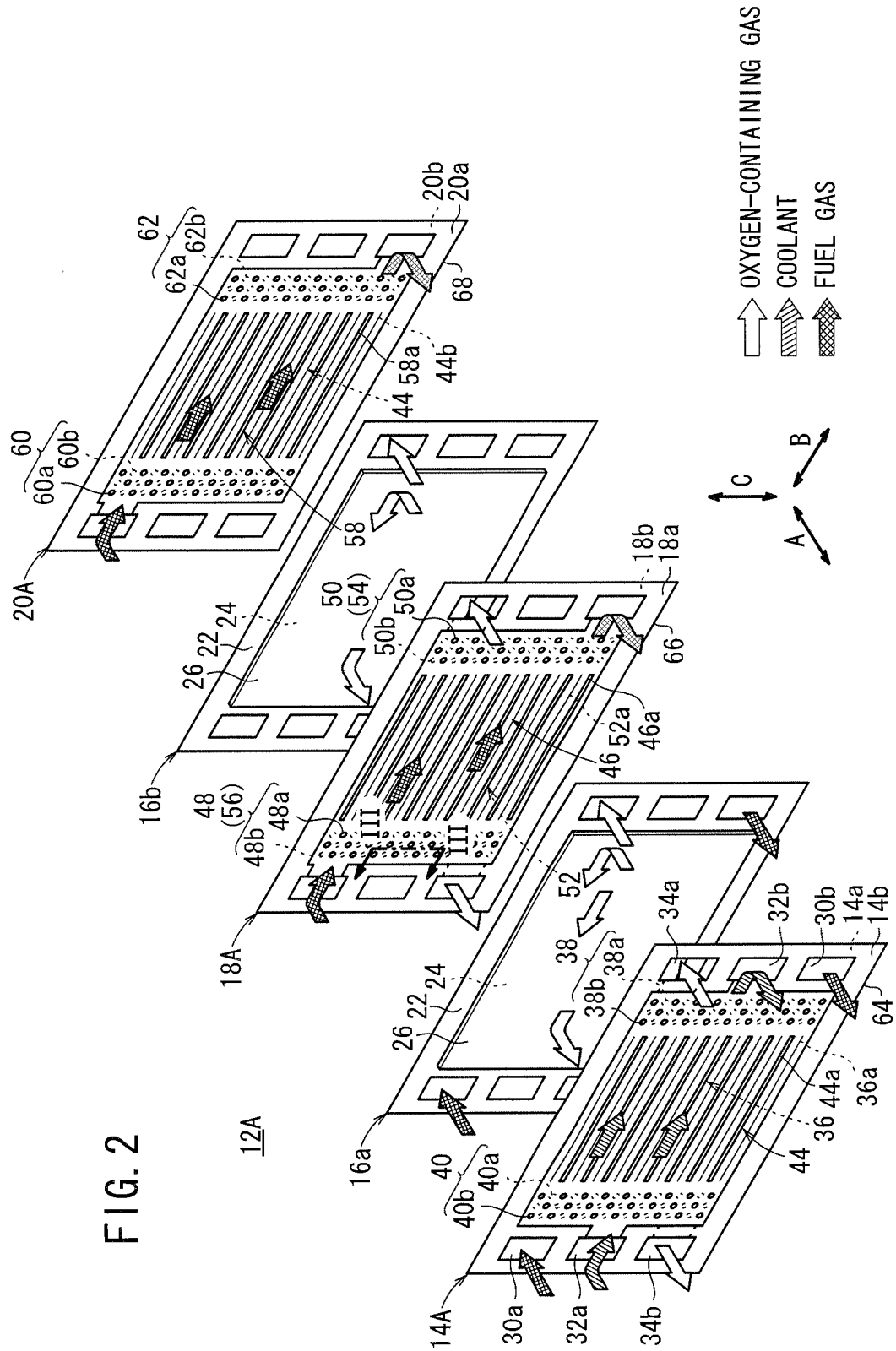
FIG. 2 is an exploded perspective view showing main components of a first power generation unit of the fuel cell stack.

The fuel cell stack 10 is formed by stacking a first power generation unit 12A and a second power generation unit 12B alternately in a horizontal direction indicated by an arrow A. As shown in FIG. 2, the first power generation unit 12A includes a first metal separator 14A, a first membrane electrode assembly (MEA) (electrolyte electrode assembly) 16a, a second metal separator 18A, a second membrane electrode assembly 16b, and a third metal separator 20A. The first power generation unit 12A may include an even number of, four or more MEAs.

For example, the first metal separator 14A, the second metal separator 18A, and the third metal separator 20A are made of steel plates, stainless steel plates, aluminum plates, plated steel sheets, or metal plates having anti-corrosive surfaces by surface treatment. Each of the first metal separator 14A, the second metal separator 18A, and the third metal separator 20A has a concave-convex shape in cross section, by corrugating a metal thin plate under pressure.

Each of the first and second membrane electrode assemblies 16a, 16b includes an anode 24, a cathode 26 and a solid polymer electrolyte membrane 22 interposed between the anode 24 and the cathode 26. The solid polymer electrolyte membrane 22 is formed by impregnating a thin membrane of perfluorosulfonic acid with water, for example.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layers are fixed to both surfaces of the solid polymer electrolyte membrane 22, respectively.

At an end of the first power generation unit 12A in the longitudinal direction indicated by an arrow B, a fuel gas supply passage 30a for supplying a fuel gas such as a hydrogen-containing gas, a coolant supply passage 32a for supplying a coolant, and an oxygen-containing gas discharge passage 34b for discharging an oxygen-containing gas are provided. The fuel gas supply passage 30a, the coolant supply passage 32a, and the oxygen-containing gas discharge passage 34b extend through the first power generation unit 12A in the direction indicated by the arrow A.

At the other end of the first power generation unit 12A in the longitudinal direction indicated by the arrow B, an oxygen-containing gas supply passage 34a for supplying the oxygen-containing gas, a coolant discharge passage 32b for discharging the coolant, and a fuel gas discharge passage 30b for discharging the fuel gas are provided. The oxygen-containing gas supply passage 34a, the coolant discharge passage 32b, and the fuel gas discharge passage 30b extend through the first power generation unit 12A in the direction indicated by the arrow A.

The first metal separator 14A has a first oxygen-containing gas flow field 36 on its surface 14a facing the first membrane electrode assembly 16a. The first oxygen-containing gas flow field 36 is connected between the oxygen-containing gas supply passage 34a and the oxygen-containing gas discharge passage 34b. The first oxygen-containing gas flow field 36 includes a plurality of flow grooves 36a extending in the direction indicated by the arrow B.

At least one of an inlet buffer 38 and an outlet buffer 40 is provided adjacent to an inlet or an outlet of the first oxygen-containing gas flow field 36. Each of the inlet buffer 38 and the outlet buffer 40 has an uneven or embossed shape that includes bosses on the front and back surfaces of the first metal separator 14A which defines an intermediate height. The inlet buffer 38 and the outlet buffer 40 have a plurality of bosses 38a, 40a protruding from the surface 14a (facing the first membrane electrode assembly 16a) and a plurality of bosses 38b, 40b protruding from the surface 14b. Various shapes such as a circular shape, an oval shape, or a rectangular shape may be adopted for the bosses 38a, 38b, 40a and 40b. The bosses described later may be formed in various shapes as well.

A coolant flow field 44 is partially formed on the surface 14b of the first metal separator 14A. The coolant flow field 44 is connected between the coolant supply passage 32a and the coolant discharge passage 32b. A plurality of flow grooves (recesses) 44a are formed on the surface 14b of the first metal separator 14A, on the back of the flow grooves 36a of the first oxygen-containing gas flow field 36. Portions near an inlet and an outlet of the flow grooves 44a are back surfaces of the buffers having the bosses 40b, 38b.

The second metal separator 18A has a first fuel gas flow field 46 on its surface 18a facing the first membrane electrode assembly 16a. The first fuel gas flow field 46 is connected between the fuel gas supply passage 30a and the fuel gas discharge passage 30b. The first fuel gas flow field 46 includes a plurality of flow grooves (recesses) 46a extending in the direction indicated by the arrow B. An inlet buffer 48 and an outlet buffer 50 are provided at positions near an inlet and an outlet of the first fuel gas flow field 46.

Each of the inlet buffer 48 and the outlet buffer 50 has an uneven or embossed shape that includes bosses on the front and back surfaces of the second metal separator 18A which defines an intermediate height. The inlet buffer 48 and the outlet buffer 50 have a plurality of bosses 48a, 50a protruding from the surface 18a (facing the first membrane electrode assembly 16a) and a plurality of bosses 48b, 50b protruding from the surface 18b (facing the second membrane electrode assembly 16b).

The second metal separator 18A has a second oxygen-containing gas flow field 52 on its surface 18b facing the second membrane electrode assembly 16b. The second oxygen-containing gas flow field 52 is connected between the oxygen-containing gas supply passage 34a and the oxygen-containing gas discharge passage 34b. The second oxygen-containing gas flow field 52 includes a plurality of flow grooves (recesses) 52a extending in the direction indicated by the arrow B. An inlet buffer 54 and an outlet buffer 56 are provided at positions near an inlet and an outlet of the second oxygen-containing gas flow field 52. The second oxygen-containing gas flow field 52 is provided on the back of the first fuel gas flow field 46. The inlet buffer 54 and the outlet buffer 56 are provided on the back of the outlet buffer 50 and the inlet buffer 48.

The third metal separator 20A has a second fuel gas flow field 58 on its surface 20a facing the second membrane electrode assembly 16b. The second fuel gas flow field 58 is connected between the fuel gas supply passage 30a and the fuel gas discharge passage 30b. The second fuel gas flow field 58 includes a plurality of flow grooves (recesses) 58a extending in the direction indicated by the arrow B. An inlet buffer 60 and an outlet buffer 62 are provided at positions near an inlet and an outlet of the second fuel gas flow field 58.

Each of the inlet buffer 60 and the outlet buffer 62 has an uneven or embossed shape that includes bosses on the front and back surfaces of the third metal separator 20A which defines an intermediate height. The inlet buffer 60 and the outlet buffer 62 have a plurality of bosses 60a, 62a protruding from the surface 20a (facing the second membrane electrode assembly 16b) and a plurality of bosses 60b, 62b protruding from the surface 20b (facing the second power generation unit 12B).

The coolant flow field 44 is partially formed on the surface 20b of the third metal separator 20A. A plurality of flow grooves (recesses) 44b are formed on the surface 20b, on the back of the flow grooves 58a of the second fuel gas flow field 58.

In the first power generation unit 12A, when the first membrane electrode assembly 16a is sandwiched between the first metal separator 14A and the second metal separator 18A, ridges between the flow grooves 36a, 46a of the first oxygen-containing gas flow field 36 and the first fuel gas flow field 46 provided oppositely are arranged at the same positions in the stacking direction. Likewise, when the second membrane electrode assembly 16b is sandwiched between the second metal separator 18A and the third metal separator 20A, ridges between the flow grooves 52a, 58a of the second oxygen-containing gas flow field 52 and the second fuel gas flow field 58 are arranged at the same positions in the stacking direction.

Figure 3:
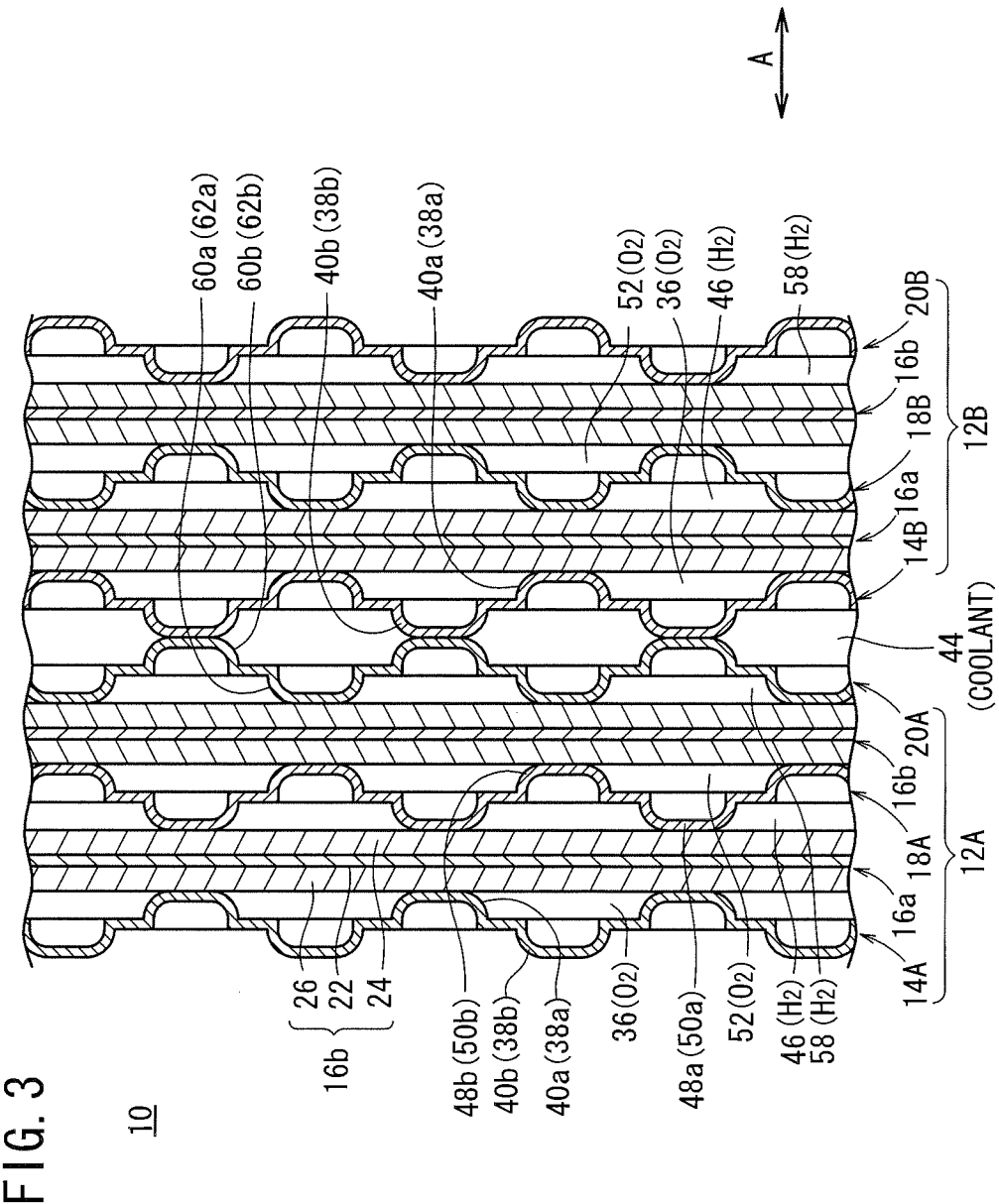
FIG. 3 is a cross sectional view showing the fuel cell stack, taken along a line III-III in FIG. 2.

In each embossed section, as shown in FIG. 3, in the first metal separator 14A and the second metal separator 18A, the bosses 40a, 48a, 38a, 50a protruding toward the first membrane electrode assembly 16a are arranged at the same positions in the stacking direction.

In the second metal separator 18A and the third metal separator 20A, the bosses 48b, 60a, 50b, 62a protruding toward the second membrane electrode assembly 16b are arranged at the same positions in the stacking direction.

As shown in FIG. 2, a first seal member 64 is formed integrally on the surfaces 14a, 14b of the first metal separator 14A, around the outer end of the first metal separator 14A. Further, a second seal member 66 is formed integrally on the surfaces 18a, 18b of the second metal separator 18A, around the outer end of the second metal separator 18A. Further, a third seal member 68 is formed integrally on the surfaces 20a, 20b of the third metal separator 20A, around the outer end of the third metal separator 20A.

As shown in FIG. 1, the second power generation unit 12B includes a first metal separator 14B, a first membrane electrode assembly 16a, a second metal separator 18B, a second membrane electrode assembly 16b, and a third metal separator 20B. The constituent elements of the second power generation unit 12B that are identical to those of the first power generation unit 12A are labeled with the same reference numerals, and detailed description thereof will be omitted.

The bosses in the inlet buffers 38, 48, 54, and 60 and the outlet buffers 40, 50, 56, and 62 of the second power generation unit 12B are arranged in different phases, i.e., staggered from the bosses of the first power generation unit 12A (see FIG. 3).

Figure 4:
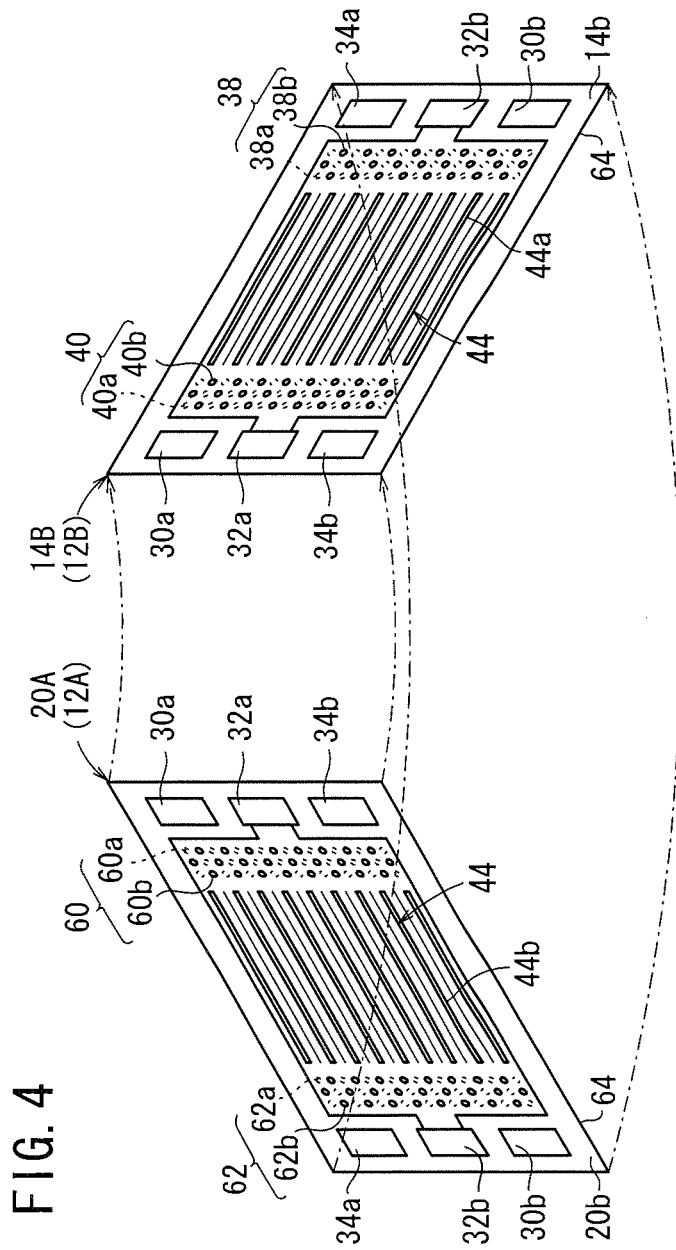
FIG. 4 is an exploded perspective view showing a third metal separator of the first power generation unit and a first metal separator of a second power generation unit.
Figure 5:
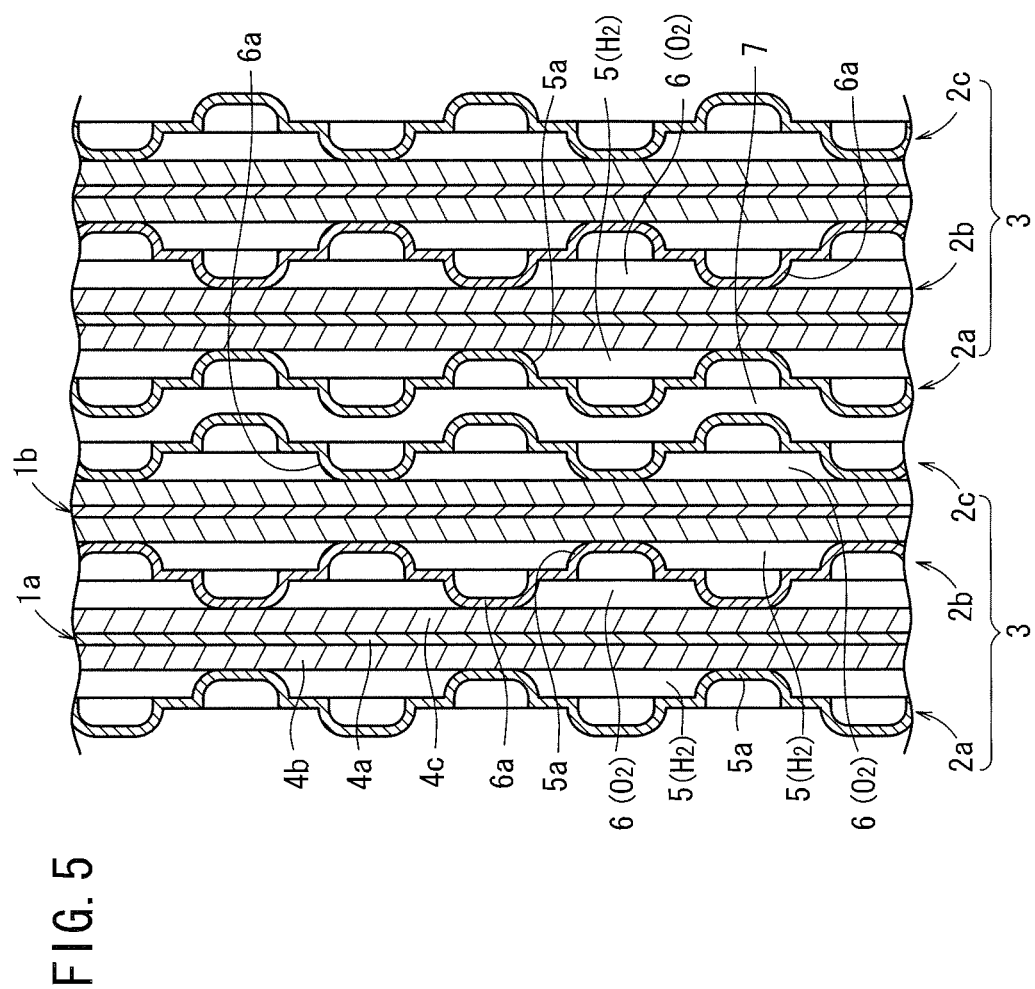
FIG. 5 is a view showing a conventional fuel cell stack.

As shown in FIGS. 3 and 4, the coolant flow field 44 is formed between the third metal separator 20A of the first power generation unit 12A and the first metal separator 14B of the second power generation unit 12B. At both ends of the coolant flow field 44, the bosses 60b, 40b facing each other, and the bosses 62b, 38b facing each other, protruding from the third metal separator 20A and the first metal separator 14B are arranged at the same positions in the stacking direction. Preferably, the ridges of the flow grooves 44b, 44a are arranged at the same positions in the stacking direction.

Operation of the fuel cell stack 10 having the above structure will be described below.

Firstly, as shown in FIG. 1, an oxygen-containing gas is supplied to the oxygen-containing gas supply passage 34a, and a fuel gas such as a hydrogen-containing gas is supplied to the fuel gas supply passage 30a. Further, a coolant such as pure water, ethylene glycol, or oil is supplied to the coolant supply passage 32a.

Thus, as shown in FIG. 2, in the first power generation unit 12A, the oxygen-containing gas flows from the oxygen-containing gas supply passage 34a into the first oxygen-containing gas flow field 36 of the first metal separator 14A and the second oxygen-containing gas flow field 52 of the second metal separator 18A. The oxygen-containing gas moves along the first oxygen-containing gas flow field 36 in the horizontal direction indicated by the arrow B, and the oxygen-containing gas is supplied to the cathode 26 of the first membrane electrode assembly 16a. Further, the oxygen-containing gas moves along the second oxygen-containing gas flow field 52 in the direction indicated by the arrow B, and the oxygen-containing gas is supplied to the cathode 26 of the second membrane electrode assembly 16b.

The fuel gas from the fuel gas supply passage 30a flows along the first fuel gas flow field 46 of the second metal separator 18A in the horizontal direction indicated by the arrow B, and the fuel gas is supplied to the anode 24 of the first membrane electrode assembly 16a. Further, the fuel gas moves along the second fuel gas flow field 58 of the third metal separator 20A in the direction indicated by the arrow B, and the fuel gas is supplied to the anode 24 of the second membrane electrode assembly 16b.

Thus, in each of the first and second membrane electrode assemblies 16a, 16b, the oxygen-containing gas supplied to the cathode 26 and the fuel gas supplied to the anode 24 are partially consumed in the electrochemical reactions at catalyst layers of the cathode 26 and the anode 24 for generating electricity.

The oxygen-containing gas after partially consumed at the cathodes 26 of the first and second membrane electrode assemblies 16a, 16b flows along the oxygen-containing gas discharge passage 34b, and is discharged in the direction indicated by the arrow A. Likewise, the fuel gas after partially consumed at the anodes 24 of the first and second membrane electrode assemblies 16a, 16b is discharged to the fuel gas discharge passage 30b.

As shown in FIGS. 3 and 4, the coolant supplied to the coolant supply passage 32a flows into the coolant flow field 44 formed between the third metal separator 20A of the first power generation unit 12A and the first metal separator 14A of the second power generation unit 12B. Then, the coolant flows in the direction indicated by the arrow B. After the coolant cools the first and second membrane electrode assemblies 16a, 16b, the coolant is discharged into the coolant discharge passage 32b.

Further, in the second power generation unit 12B, in the same manner as in the case of the first power generation unit 12A, power generation is performed by the first and second membrane electrode assemblies 16a, 16b.

In the embodiment, as shown in FIG. 3, in the first power generation unit 12A, the bosses 40a, 38a of the first metal separator 14A protruding toward the first membrane electrode assembly 16a and the bosses 48a, 50a of the second metal separator 18A protruding toward the first membrane electrode assembly 16a are arranged at the same positions in the stacking direction.

Further, the bosses 48b, 50b of the second metal separator 18A and the bosses 60a, 62a of the third metal separator 20A protruding toward the second membrane electrode assembly 16b are arranged at the same positions in the stacking direction. In the structure, no shearing force is applied to the first and second membrane electrode assemblies 16a, 16b, and damages of the first and second membrane electrode assemblies 16a, 16b can be prevented advantageously.

Further, the bosses 38a, 38b, 40a, 40b, 48a, 48b, 50a, 50b, 60a, 60b, 62a, 62b of the first power generation unit 12A and the second power generation unit 12B are staggered (arranged in different phases) from each other.

Each of the first power generation unit 12A and the second power generation unit 12B includes an even number of, e.g., two MEAs, i.e., the first and second membrane electrode assemblies 16a, 16b and an odd number of, e.g., three separators, i.e., the first metal separators 14A, 14B, the second metal separators 18A, 18B, and the third metal separators 20A, 20B. In the structure, the bosses 40a, 38a and the bosses 48b, 50b are staggered from each other, and the bosses 48a, 50a and the bosses 60a, 62a are staggered from each other.

The bosses 60b and the bosses 40b on the back of the buffers at both ends of the coolant flow field 44 formed between the first power generation unit 12A and the second power generation unit 12B are arranged at the same position in the stacking direction. Likewise, the bosses 62b and the bosses 38b are arranged at the same positions in the stacking direction.

In the structure, in the coolant flow field 44, the bosses 60b, 40b contact each other, and the bosses 62b, 38b contact each other in the stacking direction (see FIG. 3). Thus, it becomes possible to provide structure of reliably withstanding the load in the stacking direction, and withstanding the pressure change during power generation. In the structure, electrical conductivity between the first power generation unit 12A and the second power generation unit 12B does not become low. Damages due to deformation of the MEAs and the separators can be prevented. Therefore, simply by stacking the first power generation unit 12A and the second power generation unit 12B alternately, the fuel cell stack 10 can be produced simply and economically.

The invention claimed is:

1. A fuel cell stack including power generation units formed by stacking an even number of electrolyte electrode assemblies and metal separators alternately, the electrolyte electrode assemblies each including an anode, a cathode, and an electrolyte interposed between the anode and the cathode, a fuel gas flow field for supplying a fuel gas to the anode and an oxygen-containing gas flow field for supplying an oxygen-containing gas to the cathode being formed in each of power generation units, the fuel gas flow field and the oxygen-containing gas flow field each having an uneven buffer at least at one of a flow field inlet and a flow field outlet of the fuel gas flow field and the oxygen-containing gas flow field, the power generation units including a first power generation unit and a second power generation unit stacked alternately such that a coolant flow field is formed between the first power generation unit and the second power generation unit, wherein each of the first power generation unit and the second power generation unit includes at least first and second electrolyte electrode assemblies;

the first electrolyte electrode assembly is stacked on a first metal separator, a second metal separator is stacked on the first electrolyte electrode assembly, the second electrolyte electrode assembly is stacked on the second metal separator, and a third metal separator is stacked on the second electrolyte electrode assembly, in the first power generation unit, bosses of the first metal separator are in a same phase as bosses of the third metal separator;

in the second power generation unit, bosses of the first metal separator are in a same phase as bosses of the third metal separator; and bosses of the first metal separator of the first power generation unit are staggered from the bosses of the first metal separator of the second power generation unit in a direction perpendicular to the stacking direction.

2. A fuel cell stack according to claim 1, wherein, in the buffer of the first power generation unit and the buffer of the second power generation unit, bosses facing each other toward the coolant flow field are arranged at the same positions in the stacking direction.

* * * * *